United States Patent Office 3,493,317
Patented Feb. 3, 1970

3,493,317
PROCESS FOR DYEING, PADDING OR PRINTING SYNTHETIC POLYAMIDE FIBERS WITH SUBSTITUTED AMINO ANTHRAQUINONE DYESTUFFS
Jacques Guenthard, Binningen, Basel-Land, Switzerland, assignor, by mesne assignments, to Sandoz Ltd. (also known as Sandoz A.G.), Basel, Switzerland
No Drawing. Filed Aug. 6, 1965, Ser. No. 477,973
Claims priority, application Switzerland, Aug. 10, 1964, 10,441/64; Sept. 1, 1964, 11,417/64
Int. Cl. D06p 1/20
U.S. Cl. 8—39    13 Claims

ABSTRACT OF THE DISCLOSURE

Synthetic polyamide dyeings having brilliant shades and good fastness properties are prepared from dispersed dyes which are reaction products of a 1-amino-4-cyclohexylaminoanthraquinone and either a 1-halo-2,3-epoxypropane or a dihalopropanol.

---

This invention relates to a process for the dyeing, padding or printing of synthetic polyamide fibers with disperse dyes, which process consists in the use as disperse dyes of the reaction products of 1-amino-4-cyclohexylaminoanthraquinone, which may be unsubstituted or substituted by alkyl radicals, with 1-halogeno-2,3-epoxypropane or dihalogenopropanol, in which halogen represents chlorine or bromine.

The following are enumerated as examples of suitable 1-amino-4-cyclohexylaminoanthraquinones which may be unsubstituted or substituted with alkyl radicals: 1-amino-4-cyclohexylaminoanthraquinone and its derivatives which contain in the cyclohexyl radical one or more alkyl radicals having in all up to about 10 carbon atoms, e.g. 1-amino-4-(2'- or -4-(3'- or -4-(4'-methyl-, -ethyl-, -n-propyl-, -iso-propyl-, -n-butyl-, -iso-butyl-, -tert. butyl-, -n-amyl-, -iso-amyl-, -tert. amyl-, -n-hexyl-, -n-octyl-, -tert. octyl-,
-2''-ethyl-hexyl)-cyclohexylaminoanthraquinone.
1-amino-4-(2',4'- or -4-(2'5'- or -4-(2',6'-dimethyl- or -diethyl)-,
-4-(2'-methyl-4'-ethyl)-,
-4-(2'-methyl-4'-n-butyl)-,
-4-(2'-methyl-4'-tert. butyl)-,
-4-(2'-methyl-4'-tert. amyl)-,
-4-(2'-tert. butyl-4'-methyl),
-4-(2'-tert. amyl-4'-methyl),
-4-(2',4'-di-tert. butyl)-,
-4-(2',4'-di-n-butyl)-,
-4-(2',4'-di-tert. amyl),
-4-(2',4',6'-trimethyl)-,
-4-(2',4',6'-triethyl)-cyclohexylaminoanthraquinone.

Examples of polyamide fibers are nylon 6 from ε-caprolactam, nylon 11 from ω-aminoundecanoic acid, nylon 6.6 from hexamethylene-diamine and adipic acid, nylon 6.10 from hexamethylene-diamine and sebacic acid and nylon 6.6/6 which is a copolymer of hexamethylene-diamine, adipic acid and ε-caprolactam.

It is advisable to convert the dyes into a finely divided state by dry or wet grinding before they are applied to the fiber. The dye can be pasted, for example, with a dinaphthylmethane-disulfonate or a lignin-sulfonate (cellulose sulfite waste powder) and the paste ground for several hours, after which it can either be jet dried to give a fine powder or employed in the paste form. When the dye is ground in the dry state it is mixed with a sulfate of an alkali metal and a dispersant, e.g. dinaphthylmethane-disulfonate, sodium lignin-sulfonate, fatty alcohol sulfate or fatty acid-ethanolamide sulfate, or sodium N-alkyl- or N-cycloalkyl-N-higher acyl-taurate, and ground until the desired fineness is obtained. With the preparation thus obtained, after the addition of a suitable volume of water, the polyamide material can be dyed, padded or printed from a long or short liquor ratio as required.

For dyeing at long liquor ratios up to about 20 grams of dye per liter are generally used and at short liquor ratios up to about 80 grams per liter. For padding the addition may be up to about 150 grams per liter and for printing up to about 150 grams per kilogram of the print paste. The liquor ratio may vary within wide limits, e.g. from about 1:3 to 1:200 or preferably from 1:3 to 1:80.

The dyes defined above build up on polyamide fibers from aqueous dispersion. Dyeing can be carried out at temperatures of 75–100° C. at atmospheric pressure or at temperatures above 100° C., e.g. 100–140° C. in pressure dyeing equipment, preferably at 120°–130° C., at overpressures of about 1 to 4 atmospheres. Subsequently the dyed material is removed from the liquor, rinsed and dried.

Polyamide materials can also be padded or printed with aqueous dispersions of the dyes here defined. The pad dyeings or prints can be fixed at temperatures of around 100° to 230° C., e.g. with water vapor, at 100–104° C. or at 110°–130° C. under pressure, or with contact heat or by means of hot air at e.g. 180°–200° C.

The optimum pH region for dyeing, padding or printing is 2 to 9 or more especially 4 to 8.

As a rule the commonly used dispersing agents are employed either alone or in mixture, those of anionic or nonionic character being preferred. About 0.5 gram of dispersing agent per liter of the dyeing medium is often sufficient, but larger amounts up to about 3 grams per liter can be used. Amounts in excess of 5 grams per liter do not generally offer any further advantage. Examples of known anionic dispersing agents suitable for use in the process are the condensation products of naphthalenesulfonic acid and formaldehyde, notably dinaphthylmethane-disulfonates; the esters of sulfonated succinic acid; Turkey red oil and highly sulfated castor oil; the alkaline salts of the sulfuric acid esters of fatty alcohols, e.g. sodium lauryl sulfate or sodium cetyl sulfate; sulfite cellulose waste powder or its alkaline salts, e.g. sodium lignin-sulfonate; soaps; the alkali metal sulfates of the monoglycerides of fatty acids; alkali metal N-alkyl- or N-cycloalkyl-N- higher acyl-taurates, and alkali metal alkylbenzenesulfonates. Examples of known and very suitable nonionic dispersing agents are the addition products of approximately 3 to 40 moles of ethylene oxide to alkylphenols, fatty alcohols or fatty amines, and their neutral sulfuric acid esters.

The normal thickening agents are used in padding and printing, e.g. modified or unmodified natural products such as sodium alginates, British gum, gum arabic, crystal gum, locust bean gum, gum tragacanth, carboxymethyl cellulose, hydroxyethyl cellulose, methyl cellulose, starches, and synthetic products such as polyacrylamides or polyvinyl alcohols. The pad liquors and print pastes may contain other commonly used assistants such as urea, thiourea, glycols such as ethylene or propylene glycol, diethylene glycol, thio-diglycol, glycerine, or alcohols such as methyl, ethyl or iso-propyl alcohol, sodium-3-nitrobenzene-sulfonate or aqueous emulsions of sulfonated oils.

The dyeings, pad dyeings and prints obtained are of brilliant shade and have good to very good fastness to light, rubbing, thermofixation, ozone and wet treatments such as washing, perspiration, water, sea water and cross-dyeing.

In the following examples the parts and percentages are by weight and the temperatures are given in degrees centigrade.

Example 1

A mixture of 7 parts of the reaction product of 1-amino-4cyclohexylaminoanthraquinone and 1-chloro-2,3-epoxypropane, 4 parts of sodium dinaphthylmethanedisulfonate, 4 parts of sodium cetyl sulfate and 5 parts of water-free sodium sulfate is ground in a ball mill for 48 hours. Two parts of this dyeing preparation are pasted with a little water and the paste added through a sieve to a dyebath of 4,000 parts of water and 6 parts of a 30% solution of a highly sulfonated castor oil. At room temperature 100 parts of a scoured fabric of nylon 6.6 fiber are entered into the bath, which is then brought to the boil in about 45 minutes and maintained at 95–100° for one hour. The dyed nylon fabric is rinsed in warm and cold water and dried. The dyeing is of a brilliant blue shade and has excellent light fastness and very good fastness to sublimation and wet treatments, especially water, sea water, washing and perspiration.

In place of the 2 parts of the dry dyeing preparation, 5 to 15 parts of a dye paste can be used which contains 10% dye in finely divided form and 10% sodium dinaphthylmethanedisulfonate and is prepared by grinding for 24 hours in a ball mill.

Other suitable dispersing agents are sodium ligninsulfonate, the dry residue of sulfite waste liquor, sodium dodecyl, cetyl or oleyl sulfate, sodium dodecylbenzenesulfonate, sodium alkylbenzenesulfonate with 12 to 18 carbon atoms in the alkyl chain, sodium N-cyclohexyl-N-palmitoyl-taurate, sodium N-methyl-N-oleoyl- or N-palmitoyl- or N-tallow acyl-taurate, sodium alkyl-polyglycol ether sulfate with 12 to 18 carbon atoms in the alkyl radical and 2 to 6 —CH$_2$—CH$_2$—O— units in the polyglycol chain; further octylphenyl- or nonylphenyl- or dodecyl-phenyl-polyglycol ether with about 10 to 25 —CH$_2$—CH$_2$—O— units in the polyglycol chain, dodecyl-, tridecyl-, tetradecyl-, hexadecyl-, octadecyl- or octadecenyl- polyglycol ether with about 10 to 25

—CH$_2$—CH$_2$—O— units in the polyglycol chain, tert. dodecylmercaptan condensed with 10 to 20 mols of ethylene oxide, dodecylamine, tetradecylamine, cetylamine, stearylamine or oleylamine or oleylamine condensed with 7 to 25 mols of ethylene oxide, as well as the sulfates and the oxyacetates of the above mentioned polyglycol ethers.

Equally good results are obtained on fabrics of nylon 6, nylon 11 or nylon 610 fiber.

Example 2

A mixture of 1 part of the dye used in Example 1, 1 part of sodium dinaphthylmethanedisulfonate and 8 parts of water are ground to a fine dispersion which is diluted with 3000 parts of water. 100 parts of a nylon 6 fabric are entered into this dye-bath in an enclosed dyeing vessel. The bath is raised to 130° in 30 minutes and dyeing continued for 1 hour at this temperature, after which the bath is cooled, the dyed fabric removed, soaped and dried. In shade and fastness properties the dyeing is comparable to that described in Example 1.

Equally good results are obtained with fabrics of nylon 66, nylon 610 or nylon 11 fiber.

Example 3

A mixture of 1 part of the dye produced with 1-amino-4-(4'-methyl-cyclohexylamino)-anthraquinone and 1-chloro-2,3-epoxypropane, 1 part of dispersing agent employed in Example 2 and 8 parts of water is ground to a fine dispersion, to which is added 35 parts of water and 55 parts of crystal gum 1:2 to give a print paste. This is printed on a nylon 66 fabric, and after intermediate drying the print is fixed by steaming for 30 minutes at 102–104°, the unfixed portion of dye washed off and the fabric soaped at 40°. The print thus obtained has excellent all-round fastness.

Example 4

One part of the dye used in Example 1 is ground to a fine dispersion as described there. One part of poly-

TABLE

| Example No. | Cyclohexylamino radical in position 4 (I) | Halogeno-epoxypropane or Dihalogenopropanol (II) | Polyamide (III) | Method of application as in Example (IV) | Shade (V) |
|---|---|---|---|---|---|
| 5 | Cyclohexylamino | 1,3-dichloro-propanol-2 | Nylon 66 | 1 | Blue. |
| 6 | 4'-ethylcyclohexylamino | do | do | 1 | Do. |
| 7 | 4'-tert.amylcyclohexylamino | do | Nylon 6 | 2 | Do. |
| 8 | 2',4'-dimethylcyclohexylamino | 1-bromo-2,3-epoxypropane | do | 1 | Do. |
| 9 | Cyclohexylamino | 2,3-dibromopropanol-1 | do | 1 | Do. |
| 10 | do | 1,3-dibromopropanol-2 | do | 1 | Do. |
| 11 | 2',4',6'-trimethylcyclohexylamino | 1-chloro-2,3-epoxypropane | do | 3 | Do. |
| 12 | 4'-n-butylcyclohexylamino | do | Nylon 11 | 1 | Do. |
| 13 | 2'-methylcyclohexylamino | do | Nylon 66 | 4 | Do. |
| 14 | 4'-(2''-ethylhexyl)-cyclohexylamino | do | do | 1 | Do. |
| 15 | 4'-tert.octylcyclohexylamino | do | do | 1 | Do. |
| 16 | Cyclohexylamino | 2,3-dichloropropanol-1 | Nylon 610 | 1 | Do. |
| 17 | 2',5'-dimethycyclohexylamino | do | Nylon 6 | 2 | Do. |
| 18 | 2'-methyl-4'-n-butyl-cyclohexylamino | 1-chloro-2,3-epoxypropane | do | 2 | Do. |
| 19 | Cyclohexylamino | 1-bromo-2,3-epoxypropane | Nylon 66 | 1 | Do. |
| 20 | 2',6'-dimethylcyclohexylamino | 1-chloro-2,3-epoxypropane | do | 1 | Do. |
| 21 | 3'-methylcyclohexylamino | do | do | 1 | Do. |
| 22 | 4'-isopropylcyclohexylamino | do | do | 1 | Do. |
| 23 | 4'-tert.butylcyclohexylamino | do | Nylon 6 | 2 | Do. |
| 24 | 2',5'-diethylcyclohexylamino | do | do | 1 | Do. |
| 25 | 2',4'-di-tert. amylcyclohexylamino | do | Nylon 66 | 1 | Do. |
| 26 | 2'-methyl-4'-tert.butylcyclohexylamino | do | do | 1 | Do. |
| 27 | 4'-n-octylcyclohexylamino | do | do | 3 | Do. |
| 28 | 4'-n-hexylcyclohexylamino | do | do | 3 | Do. |
| 29 | 4'-methylcyclohexylamino | 2,3-dichloropropanol-1 | Nylon 610 | 1 | Do. |
| 30 | do | 1-bromo-2,3-epoxypropane | Nylon 11 | 1 | Do. |
| 31 | 4'-n-propylcyclohexylamino | 1-chloro-2,3-epoxypropane | Nylon 66 | 1 | Do. |
| 32 | 4'-n-amylcyclohexylamino | do | do | 4 | Do. |
| 33 | 2'-methyl-4'-tert.amylcyclohexylamino | do | do | 4 | Do. |
| 34 | 2',4'-di-tert.butylcyclohexylamino | do | do | 3 | Do. |
| 35 | 2',4',6'-triethylcyclohexylamino | do | do | 2 | Do. |
| 36 | 2'-tert.amyl-4'-methylcyclohexylamino | do | do | 1 | Do. |
| 37 | 4-isoamylcyclohexylamino | do | do | 1 | Do. |
| 38 | 4'-isobutylcyclohexylamino | do | Nylon 66/6 | 1 | Do. |
| 39 | 2'-ethylcyclohexylamino | do | Nylon 66 | 1 | Do. |
| 40 | 2'-methyl-4'-ethylcyclohexylamino | do | do | 1 | Do. |
| 41 | 2'-tert.butyl-4'-methylcyclohexylamino | do | do | 1 | Do. |
| 42 | 4'-n-decylcyclohexylamino | do | do | 3 | Do. |
| 43 | 4'-oxo-nonylcyclohexylamino | do | do | 3 | Do. | ethyleneglycol, 2 parts of oleylpolyglycol ether, 1.5 parts of urea, 0.5 part of oleic acid-ethanolamide and 85 parts of water are added. This solution is padded on a nylon 6 fabric at an expression giving an increase of about 70% over the dry weight. The fabric is dried at 100°, thermofixed for 1 minute at 190–200°, rinsed, soaped and dried. A brillant blue dyeing fast to light, wet treatments, thermofixation and ozone is obtained.

The dyes used in the examples of the preceding table are defined by the cyclohexylamino radical in position 4 of the 1-amino-anthraquinone and by the 1-halogeno-2,3-epoxypropane or dihalogenopropanol, further by the type of polyamide fiber to which they are applied, the method of application according to one of the Examples 1 to 4, and the shade of the dyeing, pad dyeing or print.

Having thus disclosed the invention what I claim is:

1. A process for dyeing, padding or printing synethic polyamide fiber with disperse dye, which process consists of (I) applying to the fiber an aqueous dispersion of a reaction product of (a) a 1-amino-4-cyclohexylamino-anthraquinone substituted in the cyclohexyl radical by 1 to 3 alkyl groups having a total of at most 10 carbon atoms with (b) a member selected from the group consisting of 1-chloro-2,3-epoxypropane, 1-bromo-2,3-epoxypropane, dichloropropanol and dibromopropanol and (II) fixing the dye on the fiber by a heat treatment at a temperature above 75° C.

2. A process according to claim 1 wherein (b) is 1-chloro-2,3-epoxypropane.

3. A process according to claim 1 wherein (b) is 1-bromo-2,3-epoxypropane.

4. A process according to claim 1 wherein (b) is dichloropropanol.

5. A process according to claim 1 wherein (b) is dibromopropanol.

6. A process according to claim 1, wherein the fixation of the dyeings is carried out in the dyebath at temperatures from 75° C. to 140° C.

7. A process according to claim 6, wherein the fixation of the dyeings in the dyebath is carried out at temperatures of 75° to 100° C. at atmospheric pressure.

8. A process according to claim 6, wherein the fixation of the dyeings in the dyebath is carried out at temperatures of 100° to 140° C. at overpressures of about 1 to 4 atmospheres.

9. A process according to claim 1, wherein the fixation of the pad-dyeings and prints is carried out at temperatures of around 100° to 230° C.

10. A process according to claim 9, wherein the fixation of the pad-dyeings and prints is carried out with water vapor at temperatures of 100° to 130° C.

11. A process according to claim 9, wherein the fixation of the pad-dyeings and prints is carried out with contact heat at temperatures of 180° to 200° C.

12. A process according to claim 9, wherein the fixation of the pad-dyeings and prints is carried out by means of hot air at temperatures of 180° to 200° C.

13. Synethetic polyamide fibers colored by a reaction product of (a) a 1-amino-4-cyclohexylaminoanthraquinone substituted in the cyclohexyl radical by 1 to 3 alkyl groups having a total of at most 10 carbon atoms with (b) a member selected from the group consisting of 1-chloro-2,3-epoxypropane, 1-bromo-2,3-epoxypropane, dichloropropanol and dibromopropanol.

References Cited

UNITED STATES PATENTS

| 1,045,805 | 12/1912 | Berchelmann | 260—379 |
| 2,944,870 | 7/1960 | Atkinson et al. | 8—39 |
| 3,152,113 | 10/1964 | Taber | 260—154 |
| 3,272,794 | 9/1966 | Taber et al. | 260—379 X |

FOREIGN PATENTS

| 646,786 | 6/1937 | Germany. | |

GEORGE F. LESMES, Primary Examiner

T. J. HERBERT, Jr., Assistant Examiner

U.S. Cl. X.R.

8—55; 260—379